United States Patent
Brown

(10) Patent No.: US 6,691,013 B1
(45) Date of Patent: Feb. 10, 2004

(54) BRAKING AND CONTROLLABILITY CONTROL METHOD AND SYSTEM FOR A VEHICLE WITH REGENERATIVE BRAKING

(75) Inventor: Todd Allen Brown, Dearborn, MI (US)

(73) Assignee: Ford Motor Company, Dearborn, MI (US)

( * ) Notice: Subject to any disclaimer, the term of this patent is extended or adjusted under 35 U.S.C. 154(b) by 0 days.

(21) Appl. No.: 10/064,993

(22) Filed: Sep. 6, 2002

(51) Int. Cl.[7] .................................................. G06G 7/76
(52) U.S. Cl. ........................ 701/70; 701/22; 180/65.3; 180/197; 303/152
(58) Field of Search .............................. 701/22, 70, 78, 701/83; 180/65.2, 65.3, 197; 477/188, 203; 188/156; 303/152

(56) References Cited

U.S. PATENT DOCUMENTS

| 4,335,337 A | 6/1982 | Okamatsu et al. |
| 5,318,355 A | 6/1994 | Asanuma et al. |
| 5,343,970 A | 9/1994 | Severinsky |
| 5,476,310 A | 12/1995 | Ohtsu et al. |
| 5,492,192 A | 2/1996 | Brooks et al. |
| 5,615,933 A | 4/1997 | Kidston et al. |
| 5,654,887 A | 8/1997 | Asa et al. |
| 6,033,041 A | 3/2000 | Koga et al. |
| 6,116,704 A | 9/2000 | Nakakita et al. |
| 6,454,364 B1 * | 9/2002 | Niwa et al. .................. 303/152 |

* cited by examiner

Primary Examiner—Gertrude A. Jeanglaude
(74) Attorney, Agent, or Firm—Foster, Swift

(57) ABSTRACT

The present invention provides a method and system to use feedback control algorithms to monitor and dynamically modify front and rear braking torque to initiate braking based on driver demand, initially favoring regenerative braking more than conventional braking balance would indicate while monitoring and maintaining vehicle controllability factors such as oversteer and understeer. A simple proportional-integral-derivative feedback controller can be used. Vehicle sensors for wheel speed, lateral acceleration, yaw rate, and brake position can provide input to the controller to monitor vehicle conditions and to activate non-regenerative and regenerative braking in varying proportions based on at least one actual vehicle controllability value and predetermined target value for controllability and optimization of energy recovery. Controllability factors can include predetermined longitudinal wheel slip ratios or a comparison of tire slip angle or yaw rate to a target value.

21 Claims, 2 Drawing Sheets

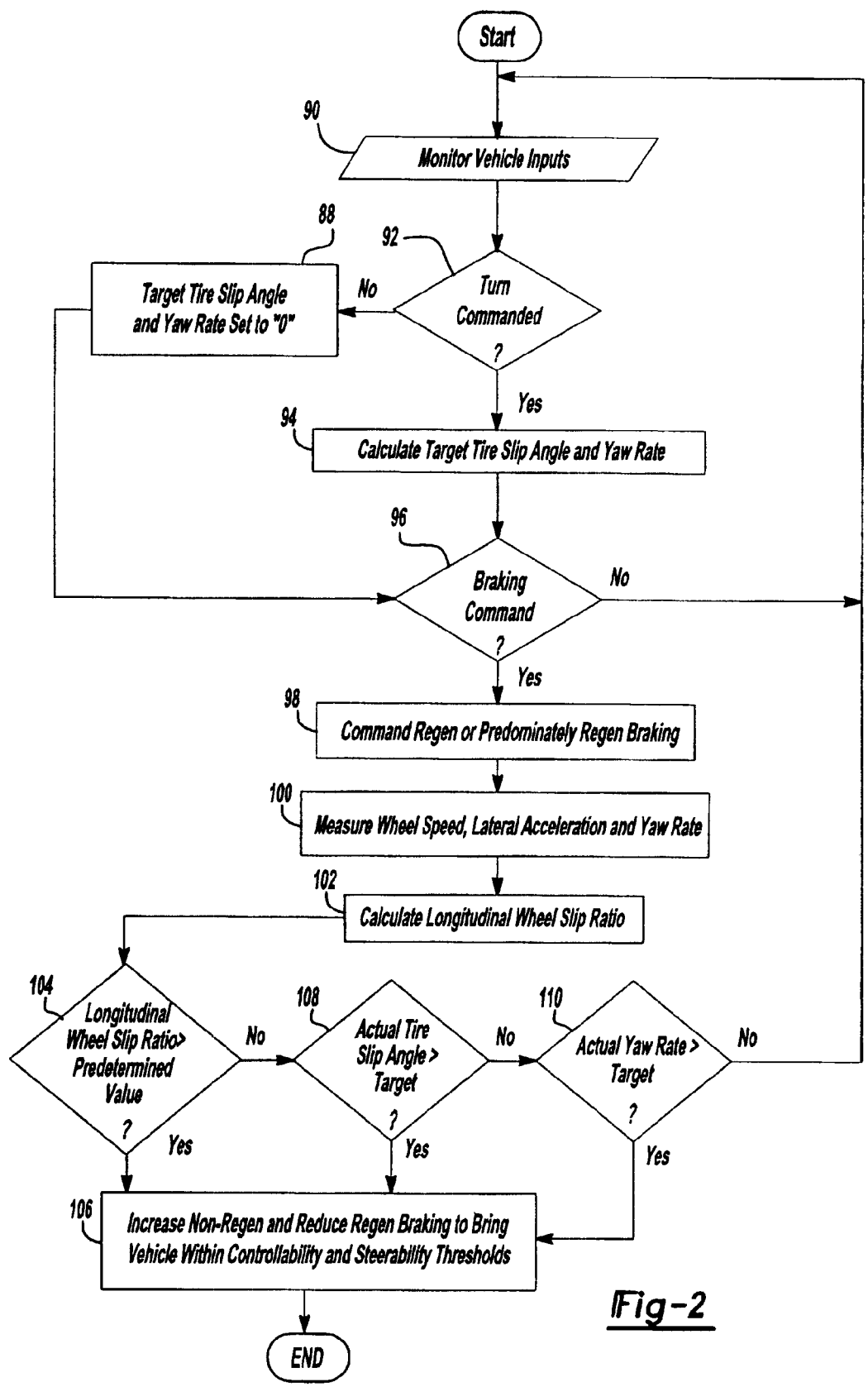

BRAKING AND CONTROLLABILITY CONTROL METHOD AND SYSTEM FOR A VEHICLE WITH REGENERATIVE BRAKING

FIELD OF INVENTION

The present invention relates generally to vehicle braking and controllability control systems, commonly referred to as stability control systems, and specifically to a braking and controllability control method and system for a vehicle with regenerative braking that optimizes energy recovery while reducing vehicle oversteer and understeer.

BACKGROUND OF THE INVENTION

The need to reduce fossil fuel consumption and emissions in automobiles and other vehicles predominately powered by internal combustion engines (ICEs) is well known. Vehicles powered by electric motors attempt to address these needs. Another alternative solution is to combine a smaller ICE with electric motors into one vehicle. Such vehicles combine the advantages of an ICE vehicle and an electric vehicle and are typically called hybrid electric vehicles (HEVs). See generally, U.S. Pat. No. 5,343,970 to Severinsky.

The HEV is described in a variety of configurations. Many HEV patents disclose systems where an operator is required to select between electric and internal combustion operation. In other configurations, the electric motor drives one set of wheels and the ICE drives a different set.

Other, more useful, configurations have developed. For example, a series hybrid electric vehicle (SHEV) configuration is a vehicle with an engine (most typically an ICE) connected to an electric motor called a generator. The generator, in turn, provides electricity to a battery and another motor, called a traction motor. In the SHEV, the traction motor is the sole source of wheel torque. There is no mechanical connection between the engine and the drive wheels. A parallel hybrid electrical vehicle (PHEV) configuration has an engine (most typically an ICE) and an electric motor that work together in varying degrees to provide the necessary wheel torque to drive the vehicle. Additionally, in the PHEV configuration, the motor can be used as a generator to charge the battery from the power produced by the ICE.

A parallel/series hybrid electric vehicle (PSHEV) has characteristics of both PHEV and SHEV configurations and is sometimes referred to as a "split" parallel/series configuration. In one of several types of PSHEV configurations, the ICE is mechanically coupled to two electric motors in a planetary gear-set transaxle. A first electric motor, the generator, is connected to a sun gear. The ICE is connected to a carrier gear. A second electric motor, a traction motor, is connected to a ring (output) gear via additional gearing in a transaxle. Engine torque can power the generator to charge the battery. The generator can also contribute to the necessary wheel (output shaft) torque if the system has a one-way clutch. The traction motor is used to contribute wheel torque and to recover braking energy to charge the battery. In this configuration, the generator can selectively provide a reaction torque that may be used to control engine speed. In fact, the engine, generator motor and traction motor can provide a continuous variable transmission (CVT) effect. Further, the HEV presents an opportunity to better control engine idle speed over conventional vehicles by using the generator to control engine speed.

The desirability of combining an ICE with electric motors is clear. There is great potential for reducing vehicle fuel consumption and emissions with no appreciable loss of vehicle performance or driveability. The HEV allows the use of smaller engines, regenerative braking, electric boost, and even operating the vehicle with the engine shutdown. Nevertheless, new ways must be developed to optimize the HEV's potential benefits.

One such area of HEV development is optimizing the braking and stability system of the HEV or any other type of vehicle using regenerative braking technology. Regenerative braking (regen) captures the kinetic energy of the vehicle as it decelerates. In conventional vehicles, kinetic energy usually dissipates as heat in a vehicle's brakes or engine during deceleration. Regen converts the captured kinetic energy through a generator into electrical energy in the form of a stored charge in a vehicle's battery. This stored energy is later used to power the electric motor. Consequently, regen also reduces fuel usage and emission production. In certain vehicle configurations, the engine can be disconnected from the rest of the powertrain thereby allowing more of the kinetic energy to be converted into stored electrical energy.

On most vehicles with regenerative braking, the regenerative braking torque is applied to, or predominantly to, the wheels of only one axle. When regenerative braking is applied to the wheels of only one axle, non-regenerative braking methods may be used at the wheels of the other axles. The desire to recover energy through regenerative braking can result in different braking torques being applied to the wheels of the different axles. The difference between the braking torques can cause unbalanced braking that may degrade vehicle controllability. Degraded controllability can be in the form of either reduced stability or reduced steerability. For example, when excessive regenerative braking torque is applied at the front axle, as in front wheel drive vehicles, the ability of the front wheels to steer the vehicle may be reduced. The reduced steerability is a condition known as understeer. When excessive regenerative braking torque is applied at the rear axle, as in rear wheel drive vehicles, the lateral friction of the rear tires may be reduced. The reduced stability is a condition known as oversteer. Both of these effects, understeer due to excessive levels of regenerative braking at the front axle and oversteer due to excessive levels of regenerative braking at the rear axle, can become greater on low friction surfaces such as ice and snow. The requirement for controllability on low friction surfaces typically forces regenerative braking levels to be reduced, resulting in a corresponding loss of energy recovery.

There are HEV patents directed to control of regenerative braking functions in various driving conditions. Koga et al. (U.S. Pat. No. 6,033,041) describes a regenerative braking control system for an electric vehicle where the regenerative braking varies as a function of vehicle inclination. Okamatsu (U. S. Pat. No. 4,335,337) describes a control system for an electric powered vehicle. This invention attempts to improve tire grip performance by adjusting the frequency of the rotations of the induction motors based on the slip frequency of the vehicle without regard to regenerative braking.

Ohtsu et al., (U.S. Pat. No. 5,476,310) also attempts to improve braking performance through the cooperation of mechanical anti-lock brakes and regenerative braking. This invention regulates excessive braking force and slip with a controller using a predetermined slip ratio. Other inventions also attempt to regulate excessive slip. See Asa et al. (U.S. Pat. No. 5,654,887) and Kidston et al. (U.S. Pat. No. 5,615,933). Unfortunately, while these inventions do reduce excessive slip, they do not provide an adequate level of stability because they focus mainly on the maximization of straight line stopping.

Asanuma et al. (U.S. Pat. No. 5,318,355), describes a switchover mode from a regenerative or friction braking mode of operation. Unfortunately, this invention is susceptible to false activation of the mode switchover.

Thus the ability to distribute brake torque between regenerative and non-regenerative braking while optimizing energy recovery and vehicle controllability constitutes and unmet need in the art.

SUMMARY OF THE INVENTION

Accordingly, the present invention provides a method and system to control braking and improve controllability of a vehicle equipped with regenerative braking. The invention can provide regenerative braking while reducing understeer and oversteer while not significantly reducing energy recovery, even on low friction surfaces. The invention continuously detects oversteer and understeer and correspondingly balances regenerative braking torque with conventional non-regenerative braking torque if controllability decreases.

In accordance with an important aspect of the present invention regenerative braking torque is applied to the wheels of at least one axle, mechanical friction or other non-regenerative brakes known in the art being connected to the wheels of another axle. In accordance with the invention the regenerative braking and non-regenerative braking forces are applied to the wheel of different axles. The vehicle has a controller having the microprocessor hardware and software to receive and evaluate sensor input of brake position and wheel speed of each wheel and to activate a generator motor which varies non-regenerative and regenerative braking in optimum proportions between the front axle and rear axle for maximum energy recovery and vehicle controllability. Vehicle controllability is determined based on at least one actual vehicle controllability value and at least one predetermined target value. Regenerative braking is adjusted so as to maintain the actual vehicle controllability value within the predetermined target value. The controller can be a simple proportional-integral-derivative feedback type of controller.

The present invention can reduce oversteer in vehicle configurations where the generator motor provides variable amounts of regenerative braking torque to the wheels of the rear axle and where the non-regenerative brakes are connected to the wheels of the front axle. The sensor input preferably includes data related to steering angle, yaw rate and lateral acceleration. In addition, vehicle controllability determinations, such as oversteer, can be based on data related to longitudinal wheel slip ratio, tire slip angle, and yaw rate. Steering angle can be determined from steering wheel position, steerable wheel position or a time-filtered determination of steering angle. The present invention can also be configured to reduce understeer in front wheel drive vehicles.

Other objects and features of the present invention will become more apparent to persons having ordinary skill in the art to which the present invention pertains from the following description and claims taken in conjunction with the accompanying figures.

BRIEF DESCRIPTION OF DRAWINGS

The foregoing objects, advantages, and features, as well as other objects and advantages, will become apparent with reference to the description and figures below, in which like numerals represent like elements and in which:

FIG. 2 illustrates a braking and controllability control strategy of the present invention.

DETAILED DESCRIPTION

Figure 1:
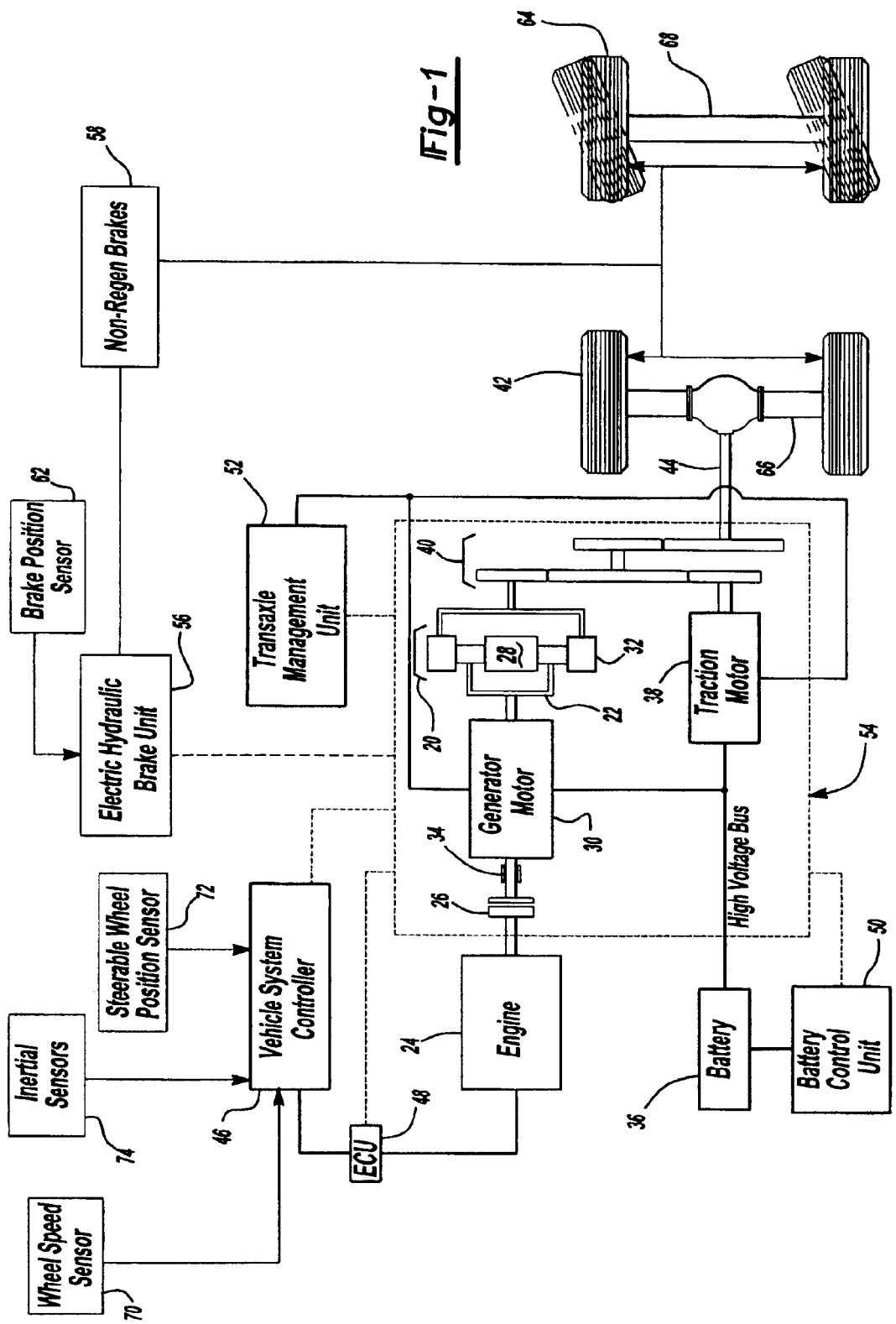
FIG. 1 illustrates a general hybrid electric vehicle (HEV) configuration.

The present invention relates to electrically propelled vehicles such as electric vehicles (EVs), hybrid electric vehicles (HEVs), and fuel cell electric vehicles (FCEVs) that have a regenerative braking system. The present invention is a system to continuously control braking and controllability for a vehicle with regenerative braking. FIG. 1 demonstrates just one possible configuration, specifically a parallel/series hybrid electric vehicle (split) configuration.

In a basic HEV, a planetary gear set 20 mechanically couples a carrier gear 22 to an engine 24 via a one-way clutch 26. The planetary gear set 20 also mechanically couples a sun gear 28 to a generator motor 30 and a ring (output) gear 32. The generator motor 30 also mechanically links to a generator brake 34 and is electrically linked to a battery 36. A traction motor 38 is mechanically coupled to the ring gear 32 of the planetary gear set 20 via a second gear set 40 and is electrically linked to the battery 36. The ring gear 32 of the planetary gear set 20 and the traction motor 38 are mechanically coupled to drive wheels 42 via an output shaft 44 that is mechanically coupled to a rear axle 66 having the drive wheels 42. For purposes of illustration, the vehicle can also have a separate pair of non-driven steerable wheels 64 connected by a front axle 68. The non-driven steerable wheels 64 are positioned toward the front of the vehicle while the drive wheels 42 are positioned toward the rear of the vehicle.

The planetary gear set 20, splits the engine 24 output energy into a series path from the engine 24 to the generator motor 30 and a parallel path from the engine 24 to the drive wheels 42. Engine 24 speed (or RPM) can be controlled by varying the split to the series path while maintaining the mechanical connection through the parallel path. The traction motor 38 augments the engine 24 power to the drive wheels 42 on the parallel path through the second gear set 40. The traction motor 38 also provides the opportunity to use energy directly from the series path, essentially running off power created by the generator motor 30. This reduces losses associated with converting energy into and out of chemical energy in the battery 36 and allows all engine 24 energy, minus conversion losses, to reach the drive wheels 42.

A vehicle system controller (VSC) 46 controls many components in this HEV configuration by connecting to each component's controller. An engine control unit (ECU) 48 can connect to the engine 24 via a hardwire interface. All vehicle controllers can be physically combined in any combination or can stand as separate units. They are described as separate units here because they each have distinct functionality. The vehicle controllers have the microprocessor hardware and software to receive and evaluate sensor input and respond according to that input. The VSC 46 communicates with the ECU 48, as well as a battery control unit (BCU) 50 and a transaxle management unit (TMU) 52 through a communication network such as a controller area network (CAN) 54. In this illustration, the BCU 50 connects to the battery 36 via a hardwire interface. The TMU 52 controls the generator motor 30 and traction motor 38 via a hardwire interface.

Further, the VSC 46 can communicate with an electric hydraulic braking unit (EHBU) 56 through the CAN 54. The EHBU 56 is connected to non-regenerative brakes 58 (e.g., mechanical brakes) that ultimately are connected to the non-driven steerable wheels 64. The EHBU 56 can control anti-lock braking systems (ABS), regenerative braking, traction control, and non-regenerative braking. In the present invention, braking control for each drive wheel 42 and non-driven steerable wheel 64 is independently available.

The VSC 46 can receive input from various vehicle component sensors. In accordance with an embodiment of the present invention inputs are provided by: a brake position sensor 62 (such as a brake pedal), wheel speed sensors 70, steerable wheel position sensors 72, and inertial sensors 74. The inertial sensors 74 can measure, for example, lateral acceleration and/or yaw rate. The brake position sensor 62 output can be sent to the VSC 46 or the EHBU 56 depending on vehicle configuration. For the present illustration, the brake position sensor 62 output is sent to the EHBU 56. Wheel speed sensors 70 are located at each vehicle wheel. The present invention provides a method and system for continuously adjusting braking between front and rear axles to optimize regenerative energy recovery while maintaining vehicle controllability. A control system for a vehicle equipped with regenerative braking, in one possible configuration, is illustrated in FIG. 1. The invention can provide regenerative braking while reducing vehicle understeer and oversteer even on low friction surfaces while not significantly reducing energy recovery on high friction surfaces.

The controller of the present invention can be physically located either within the VSC 46 or as a stand-alone unit, such as the EHBU 56. The controller continuously monitors vehicle controllability and correspondingly commands a change in regenerative braking in real time whenever vehicle controllability is reduced. The system determines vehicle controllability based on at least one predetermined target value.

As stated above, most vehicle configurations with regenerative braking apply braking torque to the wheels of one axle (or predominately to the wheels of one axle). When regenerative braking is applied to the wheels of only one axle, conventional non-regenerative braking methods can be used at the wheels of the other axles to balance the vehicle's overall braking torque. To demonstrate this in the vehicle configuration in FIG. 1, the EHBU 56 could command activation of regenerative braking at the drive wheels 42 of the rear axle 66 (i.e., a rear wheel drive configuration). The EHBU 56 could concurrently command an application of the conventional non-regenerative brakes 58 to the non-driven steerable wheels 64 of the front axle 68. In this example optimal regenerative energy is not realized because any braking torque using conventional non-regenerative brakes 58 results in kinetic energy wasted as heat. Ideally, maximum energy recovery would occur with complete regenerative braking.

A challenge to obtaining maximum energy recovery through regenerative braking is due to unbalanced braking torques between the front and rear wheels, which can affect vehicle controllability. For example, in a front wheel drive vehicle (not shown), if excessive braking torque is applied to the front steerable wheels of the front axle in an attempt to maximize energy recovery (i.e., less conventional non-regenerative braking force is applied to the wheels on the rear axle), the ability to steer the steerable wheels 64 is reduced (understeer). In a rear wheel drive vehicle, when excessive braking torque is applied at the drive wheels 42 of the rear axle 66 in an attempt to maximize energy recovery (e.g., less conventional non-regenerative braking force is applied to the front non-driven steerable wheels 64), the lateral friction of the drive wheels 42 is reduced (oversteer).

These controllability problems can become more severe on low friction surfaces such as ice and snow. The present invention thus provides a method and apparatus for maximizing energy recovery while maintaining vehicle controllability.

During a braking event, the present invention will initially rely on regenerative braking, while continuously monitoring vehicle controllability and adjust braking accordingly. The system attempts to correct control problems by maintaining vehicle controllability within a predetermined target value. This means the system of the present invention should react before conventional vehicle stability control systems engage.

To achieve the goal of vehicle controllability, objectives of the present invention are to monitor the development of any lateral instability (such as oversteer or high longitudinal wheel slip ratio) and reduce regenerative braking to achieve a more conservative brake balance. Longitudinal wheel slip ratio is determined by measuring the speed of the front wheels and the speed of the rear wheels using wheel speed sensors 70. A formula for longitudinal wheel slip ratio is:

$$\text{Longitudinal Weel Slip Ratio} = 1 - \frac{\text{Vehicle Speed} - \text{Wheel Speed}}{\text{Vehicle Speed}}$$

As a first approximation of vehicle speed, the wheel speed of the front wheels can be used for a rear wheel drive vehicle and the wheel speed of the rear wheels can be used for a front wheel drive vehicle. When rear wheel brakes are applied, vehicle deceleration comes from the rear wheels. For example, a ten percent (10%) longitudinal wheel slip ratio means the rear wheels are traveling ten (10%) slower than the vehicle. As the longitudinal wheel slip ratio increases for the rear wheels, lateral stability decreases.

The present invention uses feedback control algorithms to monitor and dynamically modify relative front and rear braking torque to initiate braking based on driver demand, initially favoring regenerative braking more than conventional braking balance would indicate, while monitoring and maintaining vehicle controllability. For a rear wheel drive vehicle, oversteer can be reduced and for a front wheel drive vehicle, understeer can be reduced.

FIG. 2 illustrates one possible configuration of the present invention by way of a block diagram of a regenerative braking controller utilizing features of the present invention. As stated above, this controller can be housed within the VSC 46 or a separate controller, such as the EHBU 56. This controller can generally include a simple proportional-integral-derivative feedback controller. The strategy illustrated in FIG. 2 can be used for a two-wheel drive, rear wheel drive vehicle with regenerative braking applied, or predominately applied, to the rear wheels to reduce oversteer situations. It is noted, though, that a front wheel drive vehicle configuration can also use the present invention to reduce understeer. For determination and alleviation of vehicle controllability problems such as oversteer and understeer, the strategy can continuously monitor longitudinal wheel slip ratios, tire slip angle, and yaw rate individually or in any combination. For purposes of illustration, the strategy presented in FIG. 2 utilizes all three methods to monitor vehicle oversteer and understeer. The strategy of FIG. 2 can also continuously adjust the proportion of regenerative and non-regenerative braking to optimize energy recovery while maintaining the actual vehicle controllability within predetermined controllability target values.

In FIG. 2, the strategy starts with each "key-on" event and ends with each "key-off" event. The strategy, once initiated at step 90, can monitor several vehicle inputs from the wheel speed sensors 70, steerable wheel position sensors 72 and brake position sensor 62.

After step 90, the strategy proceeds to step 92 and determines whether the vehicle operator has demanded a steering angle deviating from dead center (i.e., a turn). In other words, the strategy determines the degree of steering angle deviation left or right of a straight ahead direction of travel by the vehicle. If no at step 92, the strategy proceeds to step 88 and sets target tire slip angle and yaw rate to "0" then proceeds to step 96. If yes at step 92, the strategy proceeds to step 94. At step 94, the strategy calculates a target tire slip angle and target yaw rate (turn rate) and proceeds to step 96.

At step 96, the strategy determines whether a braking force has been commanded. A braking force command can come from the vehicle operator or from the VSC 46. A braking force can be requested by the vehicle operator where the braking force to be applied to the vehicle wheels is determined using input from the brake position sensor 62 and the vehicle applies braking force in relation to the position of the brake position sensor 62. A braking force can also be requested by the VSC 46, such as to simulate the engine braking during coast-down of a traditional ICE only vehicle. If no, the strategy cycles back to step 90. If yes, the strategy proceeds to step 98.

At step 98, the strategy commands braking torque using the available regenerative braking to the extent possible. For the present illustration, regenerative braking would be applied to the rear axle drive wheels 42. In an alternate embodiment having a front wheel drive configuration, the strategy would apply regenerative braking to the front wheels. Next, the strategy proceeds to step 100 to determine: wheel speed for the drive wheels 42 on the rear axle 66 and the non-driven steerable wheels 64 on the front axle 68; lateral acceleration; and yaw rate. These determinations can be obtained using various vehicle inputs such as those obtained from wheel speed sensors 70, and inertial sensors 74 of a type known in the art. The strategy then proceeds to step 102.

At step 102, the strategy calculates a longitudinal wheel slip ratio from the difference in wheel speeds and vehicle speed (as described above) and then proceeds to step 104 to make determinations of whether vehicle controllability indicators are within predetermined threshold values.

At step 104, the strategy determines whether the calculated longitudinal wheel slip ratio of step 102 exceeds a predetermined longitudinal wheel slip ratio value. For this illustration, a longitudinal wheel slip ratio value of ten percent (10%) is used, but a preferred longitudinal wheel slip ratio is five percent (5%). The predetermined longitudinal wheel slip ratio value can also be a dynamic variable that is dependent on vehicle operating conditions.

If yes at step 104, the strategy proceeds to step 106 and commands application of the non-regenerative brakes 58 on the wheels of the front axle 68 and the proportional reduction of regenerative braking on the wheels of the rear axle 66 to balance braking torque until the vehicle is within predetermined thresholds for controllability. Overall braking force remains the same or consistent with the commanded braking force. Only the proportion of regenerative braking is reduced. If no at step 104, the strategy proceeds to step 108.

At step 108, the strategy determines whether actual tire slip angle exceeds the target tire slip angle. If yes, the strategy proceeds to step 106; if no, the strategy proceeds to step 110.

At step 110, the strategy determines whether the actual yaw rate exceeds the target yaw rate. If yes, the strategy proceeds to step 106; if no, the strategy cycles back to step 90.

As described in the strategy illustrated in FIG. 2, specific calculations need to be developed to obtain target and actual values for longitudinal wheel slip ratios, tire slip angle, or yaw rates to practice the present invention. For a first calculation, the formula for longitudinal wheel slip ratio shown above can be used.

For a second calculation, tire slip angle is factored to determine a modified tire slip angle. The modified tire slip angle can also be used to determine acceptable vehicle controllability by estimating an alpha, the tire slip angle, and its rate of change, determining a target value of alpha from a tire slip angle determination, and using closed loop control to reduce the level of regenerative braking to the required amount.

Alpha and its time derivative, alpha_dot, can be estimated by known methods of calculation using inertial sensors 74. Other methods known in the art can also be used to infer tire slip angle such as Global Positioning System sensors (not shown), optical sensors (not shown), radar (not shown) and other like technologies. If the regenerative braking torque were to be applied at the rear axle 66 wheels (or primarily at the rear wheels) and therefore oversteer was the concern, then alpha and its derivative would be estimated for the rear axle 66 wheels. If the regenerative braking torque were to be applied at the front axle 68 wheels (or primarily at the front wheels) and therefore understeer was the concern, then alpha and its derivative would be estimated for the front axle 68 wheels. Note that since the front axle 68 wheels are steerable, the calculation of the alpha estimate would also include the steerable wheel position. That would also be true of the rear axle 66 wheels if they were steered.

Lateral acceleration, Ay, of the vehicle can be measured or estimated at a location corresponding to the location of alpha. The target value for alpha, alpha_target, is calculated in proportion to the absolute value of Ay according to the following equation:

$$\text{alpha\_target} = CC*abs(Ay) + \text{alpha\_offset},$$

where CC is the cornering compliance of the tires at the location of the alpha estimate and alpha_offset is a constant compensating for estimation error for alpha. The equation yields a value for alpha_target that is always positive. In the above equation, the measured value of Ay could be replaced by a value determined in some other manner that represented the limit of lateral acceleration corresponding to available surface friction.

The closed loop control of tire slip angle, alpha, using regenerative braking torque, T_regen, can be implemented as follows:

T_correction_r=max(kp*(alpha−alpha_target)+ kd*alpha_dot, 0), where kp and kd are calibratible values;

T_correction_l=max(−kp*(alpha+alpha_target)− kd*alpha_dot, 0);

T_correction=max(T_correction_r, T_correction_l); and

T_regen=T_desired_regen−T_correction.

The above equations are an implementation of a simple proportional-integral-derivative feedback controller based on the assumption that T_regen and T_desired_regen are always positive values. The torque correction, T_correction_r, corresponds to a tire slip angle in one direction (a right hand turn) while T_correction_l corresponds to the other direction. These equations will act to reduce the level of regenerative braking torque when the tire slip angle exceeds the target level.

For the third method, vehicle yaw rate, YR, is used as the indicator of vehicle controllability. Acceptable vehicle controllability is maintained by measuring the yaw rate, calculating a target value, and using closed loop control to reduce the level of regenerative braking as required to ensure that the yaw rate does not exceed the target value.

Vehicle yaw rate, YR, would be a signed value. The target value of yaw rate, YR_target, would be a signed value that is calculated using the methods which are well established in the practice of vehicle stability control. The closed loop control of yaw rate, YR, would be implemented by reducing regenerative braking torque with a correction term, T_correction, as follows:

T_correction_r=max(kp*(YR−YR_target)+kd*YR_dot+ki*YR_int, 0);

T_correction_l=max(−kp*(YR−YR_target)−kd*YR_dot−ki*YR_int, 0);

T_correction=max(T_correction_r, T_correction_l); and

T_regen=T_desired_regen−T_correction, where kp, kd and ki are calibratible values, YR_dot is the derivative of YR or (YR−YR_target) and YR_int is the integral of (YR−YR_target).

The above equations are an implementation of a simple proportional-integral-derivative feedback controller.

The above-described embodiments of the invention are provided purely for purposes of example. Many other variations, modifications, and applications of the invention may be made. Variations could include, but are not limited to, applying the invention to front wheel drive vehicles, rear wheel drive and all-wheel drive vehicles. Additionally variations could include, but are not limited to, applying the invention to front wheel steer vehicles, rear wheel steer vehicles and all-wheel steer vehicles.

What is claimed is:

1. A system for controlling braking of a vehicle comprising:
   regenerative brakes connected to wheels mounted on a first axle of said vehicle;
   non-regenerative brakes connected to wheels mounted on a second axle of said vehicle different from said first axle;
   a plurality of sensors for measuring and providing electronic signals to monitor vehicle inputs;
   a controller adapted to continuously receive and process said signals; and
   a generator motor activated by said controller for adjustably activating non-regenerative and regenerative braking in varying proportions between the wheels of said first axle and the wheels of said second axle, thereby maintaining a vehicle controllability value within a preselected target range.

2. The system of claim 1, wherein the plurality of sensors comprise a brake pedal position and wheel speed of each wheel of said vehicle.

3. The system of claim 1, wherein the controller is a simple proportional-integral-derivative feedback controller.

4. The system of claim 2, wherein:
   the generator motor provides regenerative braking torque to wheels of a rear axle;
   the non-regenerative brakes are connected to wheels of a front axle; and
   the plurality of sensors further comprise steering angle, lateral acceleration and yaw rate.

5. The system of claim 4, further comprising a vehicle controllability determination comprising a determination of a longitudinal wheel slip ratio value.

6. The system of claim 4, further comprising a vehicle controllability determination comprising a determination of a target and an actual tire slip angle.

7. The system of claim 4, further comprising a vehicle controllability determination comprising a determination of target and an actual yaw rate.

8. The system of claim 5, wherein the controller reduces regenerative braking and proportionally increases non-regenerative braking to maintain vehicle controllability when the longitudinal wheel slip ratio value is greater than 10 percent.

9. The system of claim 5, wherein the controller reduces regenerative braking and proportionally increases non-regenerative braking to maintain vehicle controllability when the longitudinal wheel slip ratio value is greater than 5 percent.

10. The system of claim 5, wherein the controller reduces regenerative braking and proportionally increases non-regenerative braking to maintain vehicle controllability when the longitudinal wheel slip ratio value is greater than a value that is dependent on vehicle operating conditions.

11. A method to continuously control braking and controllability of a vehicle comprising a generator motor adapted to adjustably provide regenerative braking torque to the wheels of a first axle, non-regenerative brakes being connected to wheels of a second axle, the method comprising the steps of:
   providing regenerative braking to wheels of said first axle; and
   controlling the vehicle by sensing vehicle conditions including brake position and wheel speed of each wheel,
   activating non-regenerative and regenerative braking in varying proportion between wheels of said first and second axles,
   determining vehicle controllability based on at least one actual vehicle controllability value and at least one predetermined controllability target value, and
   reducing regenerative braking while proportionally increasing non-regenerative braking to maintain the actual vehicle controllability value within the predetermined target value.

12. The method of claim 11, wherein the step of controlling the vehicle comprises using a simple proportional-integral-derivative feedback controller.

13. The method of claim 11, wherein said first axle comprises a rear axle and said second axle comprises a front axle; the non-regenerative brakes provide braking torque to wheels of the front axle; and the step of sensing vehicle conditions further comprises the step of sensing vehicle conditions for steering angle, lateral acceleration and yaw rate.

14. The method of claim 11, wherein the step of determining vehicle controllability comprises determining a longitudinal wheel slip ratio value.

15. The method of claim 11, wherein the step of determining vehicle controllability comprises determining a target and an actual tire slip angle.

16. The method of claim 11, wherein the step of determining vehicle controllability comprises determining target and an actual yaw rate.

17. The method of claim 14, wherein the step of reducing regenerative braking while proportionally increasing non-regenerative braking is activated when said longitudinal wheel slip ratio is greater than 10 percent.

18. The method of claim 14, wherein the step of reducing regenerative braking while proportionally increasing non-regenerative braking is activated when said longitudinal wheel slip ratio is greater than 5 percent.

19. The method of claim 14, wherein the step of reducing regenerative braking while proportionally increasing non-regenerative braking is activated when said longitudinal wheel slip ratio is greater than a value that is dependent on vehicle operating conditions.

20. An automotive vehicle, comprising:

a generator motor adapted to provide regenerative braking torque to the wheels of a first axle;

non-regenerative brakes connected to the wheels of a second axle; a controller; and a control system embodied in the controller for directing the controller to sense vehicle conditions including brake position and wheel speed of each wheel, and, based on said conditions, to activate non-regenerative and regenerative braking in varying proportion between a front axle and a rear axle, and to determine vehicle controllability based on at least one actual vehicle controllability value and at least one predetermined target controllability value, and reduce regenerative braking while proportionally increasing non-regenerative braking to maintain the actual vehicle controllability value within the predetermined target value.

21. An article of manufacture to continuously control braking and controllability for a vehicle comprising:

a generator motor having an ability to provide regenerative braking torque to the wheels of at least one axle;

non-regenerative brakes connected to the wheels of at least one axle; a controller; and a control system embodied within the controller for directing the controller to sense vehicle conditions comprising brake position and wheel speed of each wheel, activate non-regenerative and regenerative braking in varying proportion between a front axle and a rear axle, determine vehicle controllability based on at least one actual vehicle controllability value and at least one predetermined target value, and reduce regenerative braking while proportionally increasing non-regenerative braking to maintain the actual vehicle controllability value within the predetermined target value.

* * * * *